US012126590B2

(12) United States Patent
Jain et al.

(10) Patent No.: US 12,126,590 B2
(45) Date of Patent: *Oct. 22, 2024

(54) SECURELY PUBLISHING APPLICATIONS FROM PRIVATE NETWORKS

(71) Applicant: Palo Alto Networks, Inc., Santa Clara, CA (US)

(72) Inventors: Jayant Jain, Cupertino, CA (US); Brian Russell Kean, Cincinnati, OH (US); Aditya Srinivasa Ivaturi, Santa Clara, CA (US); Mohit Sahni, Fremont, CA (US); Mingfei Peng, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,072

(22) Filed: Jul. 31, 2023

(65) Prior Publication Data

US 2024/0187371 A1 Jun. 6, 2024

Related U.S. Application Data

(63) Continuation of application No. 18/060,774, filed on Dec. 1, 2022, now Pat. No. 11,757,826.

(51) Int. Cl.
*H04L 61/256* (2022.01)
*H04L 61/2592* (2022.01)
*H04L 61/4511* (2022.01)
*H04L 101/618* (2022.01)

(52) U.S. Cl.
CPC ........ *H04L 61/256* (2013.01); *H04L 61/2592* (2013.01); *H04L 61/4511* (2022.05); *H04L 2101/618* (2022.05)

(58) Field of Classification Search
None
See application file for complete search history.

(56) References Cited

U.S. PATENT DOCUMENTS

| 7,139,841 | B1 | 11/2006 | Somasundaram et al. |
| 7,533,164 | B2 | 5/2009 | Volz et al. |
| 2015/0244671 | A1 | 8/2015 | Sinn et al. |
| 2019/0190894 | A1 | 6/2019 | Kapoor et al. |

*Primary Examiner* — Angela Nguyen
(74) *Attorney, Agent, or Firm* — Gilliam IP PLLC

(57) ABSTRACT

A controller can securely publish an application of a tenant by securely extending a network fabric into the networks of the tenant with virtual private networks and NAT. After a tenant deploys an application into one or more networks of the tenant, the tenant can indicate select applications to publish. The network controller assigns a network address from the routable address space of the network fabric to the application and a network address aggregate to each application connector that will front an instance of the application, which securely extends the network fabric into the tenant network. The network controller configures NAT rules in the network fabric and on the application connector to create a route for traffic of the application through the network fabric to the application instance using a fully qualified domain name assigned to the application without exposing a private network address of the application instance and preserving security of other resource on the tenant network.

20 Claims, 5 Drawing Sheets

SECURELY PUBLISHING APPLICATIONS FROM PRIVATE NETWORKS

BACKGROUND

The disclosure generally relates to transmission of digital information (e.g., CPC class H04L) and network arrangements, protocols or services for addressing or naming (e.g., subclass H04L 61/00).

The Request for Comments (RFC) 5382 document, RFC 5508 document, and the RFC 4787 document specify Internet best current practices for behavioral properties of a network address translator for Transmission Control Protocol (TCP), Internet Control Message Protocol (ICMP), and unicast User Datagram Protocol (UDP), respectively. Generally, network address translation (NAT) provides for mapping between Internet Protocol (IP) addresses of different address realms. This allows for transparent routing to end hosts. The RFC 2663 document states, "Transparent routing refers to routing a datagram between disparate address realms, by modifying address contents in the IP header to be valid in the address realm into which the datagram is routed."

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

This term "application connector" refers to a network element deployed in a network to front an application. The application connector "fronts" an application by providing access to an instance of the application without publicizing a network address assigned to the application instance. Fronting an application is also referred to herein as proxying or being a proxy for an application.

The description refers to securely "exposing" or "publishing" an application. In this description, securely exposing/publishing an application refers to providing access to an application instance without revealing private information about the application instance (e.g., the local network address). Securely exposing/publishing an application also refers to providing access to an instance of the application without exposing other resources of the network (e.g., a cloud compute resource or storage location) in which the application instance is hosted.

The description refers to a "network controller" and "controller." Both terms refer to a device programmed and configured to provide instructions/commands for network management and/or orchestrating network functions, or to a program(s) that generates instructions/commands for network management and/or orchestrating network functions when the program(s) is executed.

Overview

A network controller can securely publish an application of a customer or tenant by extending a network fabric into the networks of the customer/tenant (hereinafter only "tenant" for brevity). After a tenant deploys an application into one or more networks/sites of the tenant, the tenant can indicate applications to publish. The network controller assigns a network address aggregate (e.g., prefix) from the routable address space of the network fabric to each application connector that will act as a proxy or front for the application. This securely extends the network fabric into the tenant network allowing the tenant to rely on the security of the network fabric. The network controller orchestrates configurations of DNS entries in the network fabric, and orchestrates configurations of NAT rules in the network fabric and on the application connectors. This creates routes for traffic of the application through the network fabric to instances of the application using a fully qualified domain name assigned to the application without exposing private network addresses of the application instances and while preserving security of other resources on the tenant network.

Example Illustrations

Figure 1:
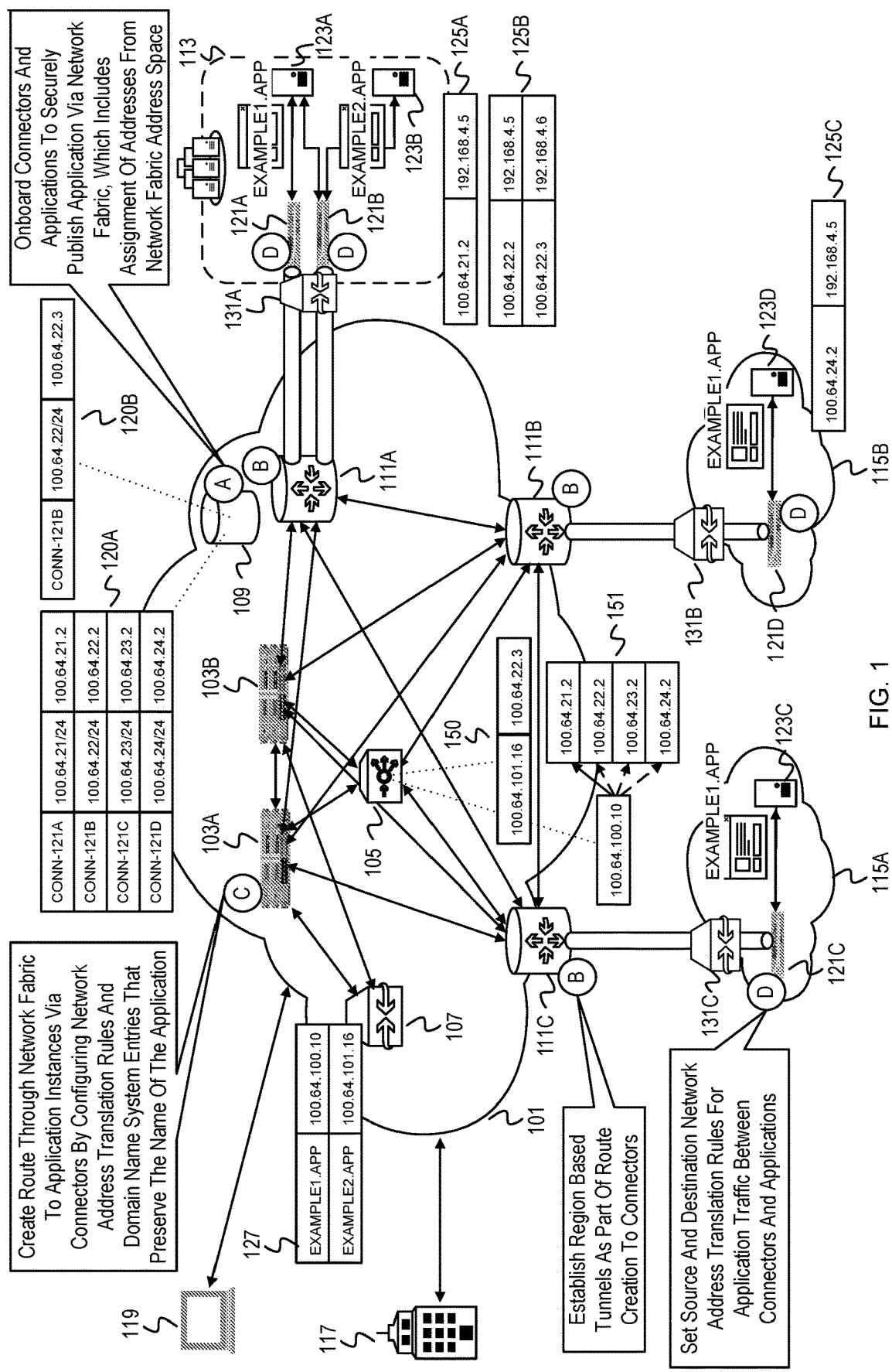
FIG. 1 is a system diagram of a network fabric securely publishing a tenant application via routes through the network fabric to application connectors fronting instances of the application.

FIG. 1 is a system diagram of a network fabric securely publishing a tenant application via routes through the network fabric to application connectors fronting instances of the application. FIG. 1 depicts a network fabric 101, a data center 113, and tenant networks 115A-115B. The tenant networks 115A-115B can be private networks of a company, a virtual private cloud, etc. While implementations can securely publish applications for different tenants, FIG. 1 depicts only two applications for a single tenant to avoid obfuscating the description.

A tenant hosts instances of an application with a name "EXAMPLE1.APP" across multiple networks of the tenant and an instance of an application named "EXAMPLE2.APP" at a single site in FIG. 1. Instances of the application EXAMPLE1.APP are hosted at the data center 113 and the networks 115A-115B. At the data center 113, an instance of EXAMPLE1.APP is hosted on an application server 123A. The instances of EXAMPLE1.APP hosted at the networks 115A-115B are depicted on application servers 123C-123D, respectively. The data center 113 hosts an instance of EXAMPLE2.APP on an application server 123B. FIG. 1 depicts application connectors 121A-121B deployed in the data center 113. Application connectors 121C-121D are respectively deployed in the networks 115A-115B. The illustrations suggests that the application connectors are hardware, but can be software (e.g., virtual security appliances). In FIG. 1, each tenant network is depicted with a gateway. The data center 113, network 115A, and network 115B respectively have gateways 131A-131C.

A mobile user 119 and a tenant site 117 are depicted as accessing either or both applications via the network fabric 101 once published. Numerous other users can use the applications.

The network fabric 101 includes network elements with various capabilities to onboard connectors and applications and to create routes through the network fabric to extend the network fabric into tenant networks. At least one of network elements 103A—103B is programmed as a network controller (e.g., cloud-based network controller, software-defined wide area network (SD-WAN) controller, etc.) to communicate with other network elements of the network fabric to securely publish applications. An implementation different than what is depicted can use a network controller external/remote to the network fabric 101 to facilitate all or part of the onboarding and route creating to securely publish applications via the network fabric 101. Moreover, network elements or instances of network elements can exist in different geographical zones. For efficiency, this illustration presumes the network element 103A is programmed as a controller for the network fabric 101. The network element 107 is programmed at least with domain name system proxy capabilities. Network elements 111A-111C are programmed at least with forwarding and tunneling capabilities. Network element 105 is at least programmed with load balancing functionality.

FIG. 1 is annotated with a series of letters A-D each representing a stage of one or more operations. Although these stages are ordered for this example, the stages illustrate one example to aid in understanding this disclosure and should not be used to limit the claims. Subject matter falling within the scope of the claims can vary from what is illustrated.

At stage A, the controller 103A onboards application connectors and applications to securely publish the onboarded applications via the network fabric 101. Onboarding is performed by one or more controllers configured for connector and/or application onboarding. Onboarding includes updating a repository 109 associated with the network fabric 101, but the repository is not necessarily a node within the network fabric 101. To onboard a connector, the repository 109 is updated with connector information that at least identifies a connector with at least a routable network address of the connector and a geographic region of the connector. Most likely, the address of a connector will be an address of a gateway of the tenant network in which the connector is deployed since the connector will be "behind" the gateway of the local (tenant) network. To onboard an application, the repository 109 is updated with application information that at least identifies the application by name (e.g., a fully qualified domain name). If the repository 109 hosts information for multiple tenants, the per tenant information is securely isolated from each other. Onboarding can include other operations to authenticate a connector, such as obtaining certificates or tokens. Onboarding also includes assigning network addresses from a routable address space of the network fabric 101 to applications and connectors. As part of onboarding an application connector, the controller 103A will allocate an aggregate of addresses (e.g., a prefix or slice of addresses) from the routable address space to the application connector. When onboarding an application, the controller 103A will assign the application a routable address to be applied globally ("global address") and each instance of the application a network address from the network address aggregate assigned to the corresponding connector. These network addresses are assigned from one or more address pools allocated for a tenant in advance. FIG. 1 depicts example populated data structures 120A-120B (which can be records or entries in a database or repository) with network address information for the onboarded applications and connector. The populated data structure 120A indicates a grouping of the connectors 121A-121D for EXAMPLE1.APP. The populated data structure 120B indicates a single member connector group for EXAMPLE2.APP—the group only includes the connector 121B named CONN-121B. The illustrated information incorporates the FIG. 1 labels into the connector naming convention. As illustrated, each connector in a first connector group corresponding to structure 120A has been assigned a different prefix (column 2 of the data structure 120A) and each instance of EXAMPLE1.APP has been assigned a network address (column 3 of the data structure 120A) within the address aggregate of the corresponding connector.

At stage B, region-based tunnels are established between the network elements of the network fabric 101 and onboarded application connectors as part of route creation to the application connectors. Each of the network elements 111A-111C corresponds to a different geographic region. A network element can be activated (e.g., installed or instantiated) as part of onboarding a connector or may already be activated. To illustrate, assume none of the network elements 111A-111C are yet active. The controller 103A uses the network addresses communicated from gateway 131A for the geographic location of the connectors 121A-121B. The controller 103A causes activation of the network element 111A in a region based on the determined geographic location of the addresses communicated by the gateway 131A. For the connector 121C, the controller 103A uses the network address communicated from the gateway 131C for the geographic location. The controller 103A causes activation of the network element 111C in a region based on the determined geographic location of the addresses communicated by the gateway 131C. The controller 103A uses the network address communicated from the gateway 131B for the geographic location of the connector 121D. The controller 103A causes activation of the network element 111B in a region based on the determined geographic location of the address communicated by the gateway 131B. The controller 103A instructs the network element 111A to anticipate initiation of a tunnel establishment from the connector 121A and another tunnel establishment from the connector 121B. The network elements 111A-111C will have public network addresses that allow connectors to initiate tunnel establishment. The controller 103A provides the connectors 121A-121B with the public network address of the network element 111A for tunnel establishment. The controller 103A instructs the connectors 121D and 121C to establish tunnels with the network elements 111B-111C, respectively. This is part of route creation for application exposure, but route creation also includes the operations indicated in stages C-D. While the other stages of route creation refer to other network elements, they likely operate based on messages/commands from the controller 103A.

At stage C, the controller 103A creates routes through the network fabric 101 to application instances via application connectors by configuring network address translation rules and domain name system (DNS) entries. Assume the controller 103A assigned the application named EXAMPLE1.APP the network address 100.64.100.10 and the application named EXAMPLE2.APP the network address 100.64.101.16. The controller 103A communicates with the DNS proxy 107 to insert DNS entries 127 for the applications. The DNS entries 127 are set to resolve the name EXAMPLE1.APP to the network address 100.64.100.10 and to resolve the name EXAMPLE2.APP to the network address 100.64.101.16. The controller 103A also communicates with a load balancer 105 to configure destination NAT rules that translate the global application addresses to network addresses of the application instances fronted by the application connectors 121A-121D. Assume the controller 103A allocated the application connector 121A the network address prefix 100.64.21/24 and the application connector 121B the network address prefix 100.64.22/24. The connector 121A fronts an instance of EXAMPLE1.APP and the connector 121B fronts an instance of EXAMPLE2.APP. The controller 103A assigns the application connectors 121C-121D the prefixes 100.64.23/24 and 100.64.24/24, respectively. The controller 103A communicates with the load balancer 105 to set destination NAT rules 150, 151. Applying the destination NAT rule 151 translates the network address 100.64.101.16 assigned to EXAMPLE1.APP to the one of the network addresses assigned to instances of EXAMPLE1.APP in the group represented by the structure 120A, which includes the connectors 121A, 121B, 121C, 121D. Selection of the destination network address within the group depends upon the load balancing algorithm implemented and configuration of the load balancer 105. The controller 103A communicates with the load balancer 105 to set a destination NAT rule 150 to translate the network address 100.64.101.16 assigned to EXAMPLE2.APP to the network address 100.64.22.3 assigned to the EXAMPLE2.APP instance fronted by the connector 121B. Other connectors may be onboarded for other instances of EXAMPLE2.APP. The controller 103A also communicates with network elements of the network fabric 101 to install routes for the application instance addresses to corresponding tunnels. For instance, the controller 103A communicates to update network tables (e.g., routing tables, forwarding tables, and label forwarding tables) to indicate the tunnel between the network element 111B and the connector 121D for the network address 100.64.24.2.

At stage D, the controller 103A communicates with the application connectors 121A-121D to configure destination NAT rules for transitioning application traffic from the network fabric 101 to the application instances in the tenant networks. The controller 103A communicates with the connector 121A to set a destination NAT rule 125A to translate the network address 100.64.21.2 to a private network address 192.168.4.5 assigned to the EXAMPLE1.APP instance on the application server 123A from an address space of the data center 113. The controller 103A communicates with the connector 121B to set destination NAT rules 125B to translate the network address 100.64.22.2 and 100.64.22.3 to private network addresses 192.168.4.5 and 192.168.4.6, respectively. The EXAMPLE2.APP instance on the application server 123B was assigned 192.168.4.6 from the address space of the data center 113. The controller 103A communicates with the connector 121D to set a destination NAT rule 125C to translate the network address 100.64.24.2 to a private network address 192.168.4.5 assigned to the EXAMPLE1.APP instance on the application server 123D from an address space of the network 115B. The example illustration used overlapping address spaces from which private network addresses were assigned to application instances in the data center 113 and the network 115B. This is not necessary.

After the route creation has completed for an application, the controller 103A can complete publication of the application to allow clients, such as the mobile user 119 or endpoints within the site 117, to access instances of the application via the network fabric 101. For instance, the controller 103A can set a flag or generate a notification to the network elements of the network fabric 101 indicating the DNS entry as active or available.

Figure 2:
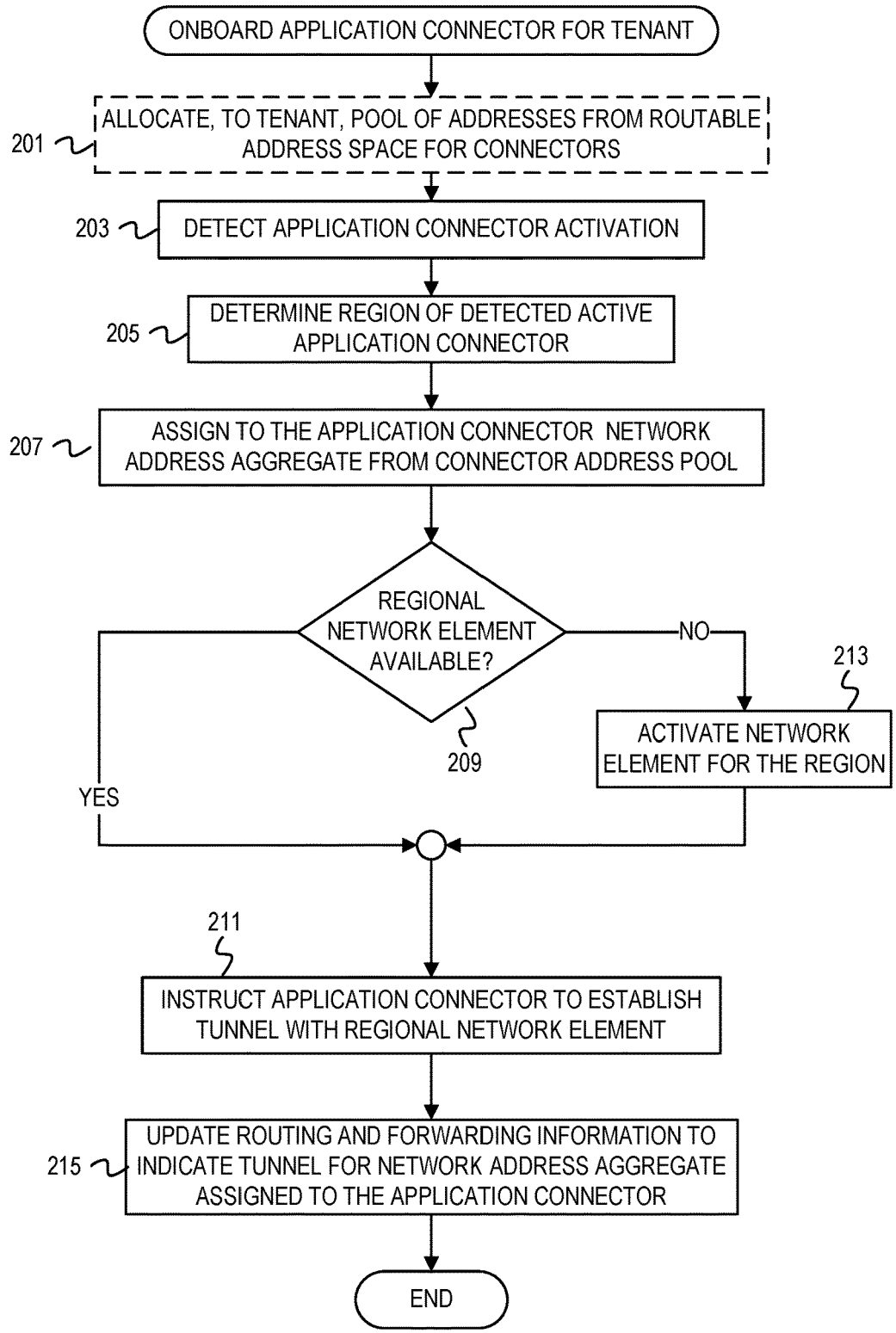
FIG. 2 is a flowchart of example operations for onboarding an application connector for a tenant.

FIG. 2 is a flowchart of example operations for onboarding an application connector for a tenant. The operations will be described as being performed by a controller for consistency with FIG. 1.

At block 201, the controller allocates to a tenant a pool of addresses from a routable address space of a network fabric associated with the controller. The controller allocates the pool of network addresses for application connectors. Block 201 is depicted in a dashed line because this operation may be performed by a separate program in advance of connector onboarding.

At block 203, the controller detects an application connector activation. A tenant may deploy an application connector which triggers a reporting or messaging (e.g., license activation) that communicates to the controller that the application connector is active. The application connector or a managing and/or installing program can provide information identifying the application connector (e.g., by a serial number or license number) to the controller. Since the application connector is deployed within a tenant network, the public network address provided for the application connector will be from a gateway or edge device of the tenant network. This address will be referred to as the public network address of the application connector. An implementation may task the controller with deploying an application connector in a tenant network.

At block 205, the controller determines a geographic region of the activated application connector. The controller can determine geographic region with network information obtained when detecting activation of the application connector, for example the public network address of the connector. Alternatively, region identification can be provided via a user interface.

At block 207, the controller assigns a network address aggregate to the application connector from the allocated address pool. A database or data structure is updated to associate the network address aggregate with an identifier of the application connector. As an example, a data structure or database entry that represents a group of connectors can be updated with the association of the application connector identifier and the assigned network address aggregate.

At block 209, the controller determines whether a regional network element is available. For instance, the controller queries a table of network elements of the network fabric to find access nodes or edge nodes of the network fabric with tunneling capability in the same region as the detected application connector. If a regional network element is available, operational flow proceeds to block 211. Otherwise, operational flow proceeds to block 213.

At block 211, the controller provides a network address of the regional network element to the application connector and instructs the application connector to establish a virtual private network (VPN) tunnel (e.g., an Internet Protocol Security (IPsec) tunnel, a Layer 2 Tunneling Protocol (L2TP) tunnel, etc.) with the regional network element.

At block 213, the controller activates a regional network element. The controller can instantiate a network element with at least tunneling and forwarding functionality on a server in the region of the application connector. Operational flow proceeds to block 211 for the activated regional network element to establish a tunnel with the connector.

At block 215, the controller updates routing and forwarding information in the network fabric to indicate the established tunnel for the network address aggregate assigned to the application connector. The controller communicates with the network elements to cause routing tables, forwarding tables, and label forwarding tables to be updated to create a static route for addresses within the network address aggregate to the tunnel that has been established to the application connector.

While the example operations are directed to onboarding an individual application connector, embodiments are not so limited. An embodiment may handle connector onboarding or aspects of connector onboarding in batches of connectors. For instance, a controller(s) may obtain information for multiple application connectors for a region and then establish tunnels to those application connectors before proceeding to a next region of the tenant. As another example, an embodiment may first establish a tunnel for each region and subsequently establish additional tunnels per region for additional connectors in the regions.

Figure 3:
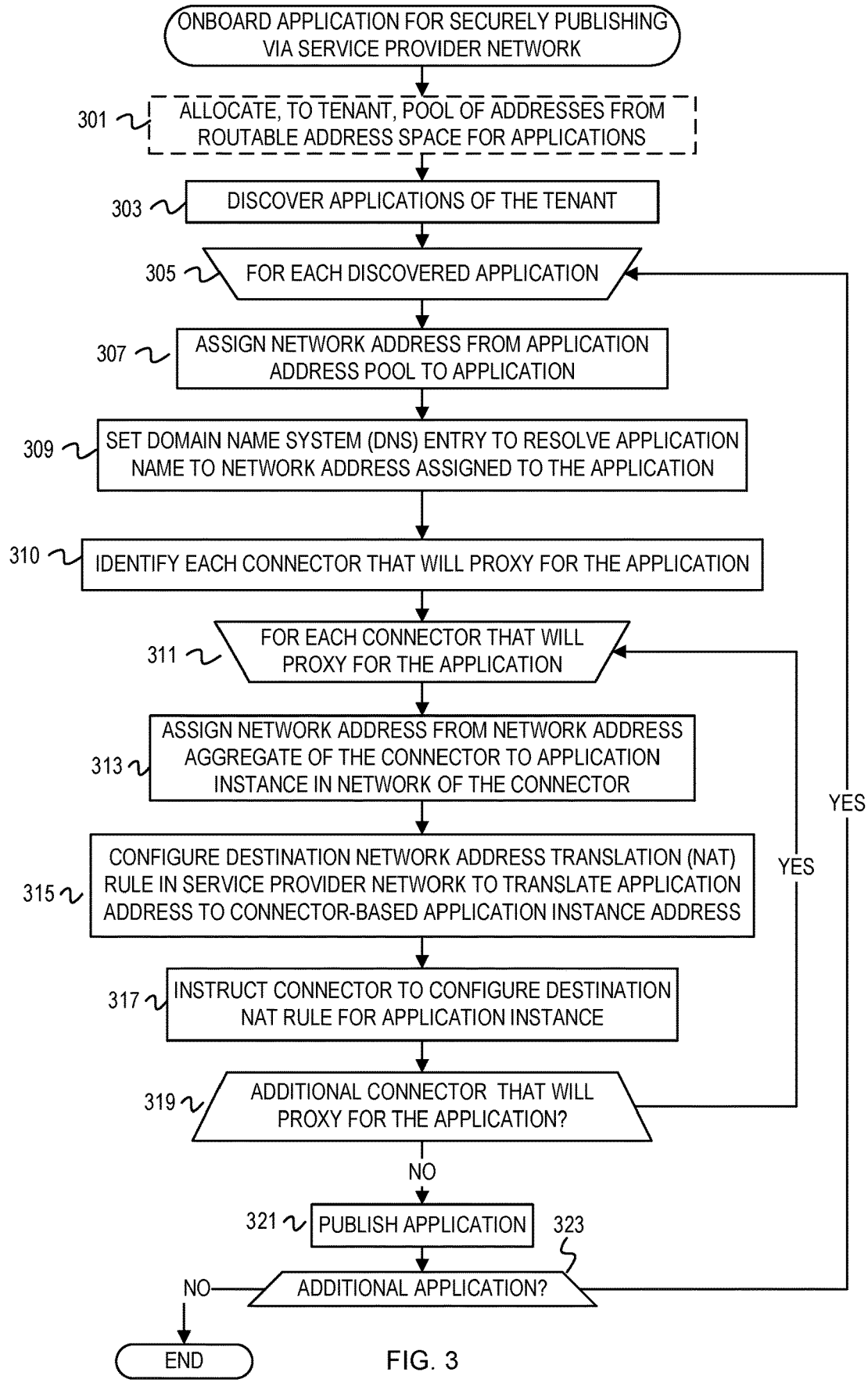
FIG. 3 is a flowchart of example operations for onboarding an application to securely publish the application via a service provider network.

FIG. 3 is a flowchart of example operations for onboarding an application to securely publish the application via a service provider network. The description of the flowchart refers to a controller as performing the example operations. As previously mentioned, the controller may be hosted on a device or appliance within the service provider network ("internal controller") or be hosted on a device or appliance external to the service provider network ("external controller"). Moreover, the controller may be a device or appliance. In addition, multiple controllers may coordinate to onboard an application. For instance, an external controller may discover applications to publish and communicate with an internal controller that creates a route(s) through the service provider network to the connector(s) that front the application to publish.

At block 301, the controller allocates to a tenant a pool of addresses from a routable address space of the service provider network. The controller allocates the pool of network addresses for applications to publish for the tenant. The controller may use a block of addresses (e.g., /24) and then apportion the addresses between the application pool and the connector pool. Instead, the controller may separately allocate address sub-ranges or blocks per pool (e.g., /24 for applications and/24 for connectors). The sizes of the address pools are not necessarily the same. Block 301 is depicted in a dashed line because this operation may be performed by a separate program in advance of connector onboarding, for example as part of setting up a tenant.

At block 303, the controller discovers applications of the tenant to publish. This discovery includes obtaining a domain name (e.g., a FQDN) assigned to each application. Discovery can also include obtaining hosting location information for the application (e.g., site identifiers). Discovery may involve the controller communicating with another service or program that catalogs applications for a tenant. In addition or instead, discovery may involve receiving selections via a user interface. To illustrate, the controller can query or request application information from a service(s) and/or program(s) that has created a listing(s) of applications offered by the tenant. A user interface can be presented with the identified applications for selection of which applications to securely publish via the service provider network.

At block 305, the controller begins to iteratively perform operations to onboard the applications to publish. Based on the discovery, a data structure or database has been updated with the listing of applications to publish. The listing at least includes the application names.

At block 307, the controller assigns a network address from the application address pool to the application. For instance, the controller updates a repository that hosts a listing of tenant applications to publish with the network address. Although assigned, the controller does not communicate the network address to a server hosting an instance of the application for binding. This "global" network address is assigned to the application and exposed for access to the application and to be mapped to addresses assigned to application instances corresponding to the connectors.

At block 309, the controller sets a DNS entry to resolve the application name to the global network address assigned to the application. The controller communicates with one or more DNS proxies of the service provider network to set the DNS entry.

At block 310, the controller identifies each connector that will proxy for the application. As an example, onboarded connectors (or during onboarding) can be logically grouped together with the applications for which the connectors will proxy. A configuration interface can be provided to logically group the applications and connectors. A program(s) underlying the configuration interface can automatically relate specified connectors and instances of applications according to configurable parameters, such as geographic constraints, and trigger the route creation to support the proxying by the constituent connectors. An interface can use geographic limitations to limit the available connectors and applications for grouping. For instance, the controller queries the onboarded connector data with site identifiers obtained for the discovered application. An embodiment can weave connector activation and onboarding into the application discovery process. As an example, the controller can coordinate connector activation/deployment in each network indicated as hosting an application instance. In some cases, a tenant may designate an application connector for an application instance. As part of application discovery, a user can select via a user interface an application connector for an application instance and this is indicated in the application discovery data. If no connector is available, a notification can be generated that an application connector must be activated at a site hosting an instance of the application before the application can be onboarded for secure publishing.

At block 311, the controller begins iterating through the identified connectors. The controller can proceed according to ordering indicated by a connector group data structure, by region, etc.

At block 313, the controller assigns a network address ("local network address") from the network address aggregate of the connector to an instance of the application in the network of the connector. An ordering or pattern of address assignments from an address aggregate can vary with implementation.

At block 315, the controller configures a destination NAT rule in the service provider network to translate the global network address assigned to the application to the local network address assigned to the application instance based on connector proxy. If it is determined in advance that an application will only be fronted by a single connector and load balancing will not be utilized for traffic of the application, an implementation can use a same network address for the global and local network addresses and eschew the destination NAT rule in the service provider network. However, this will likely limit scalability.

Figure 4:
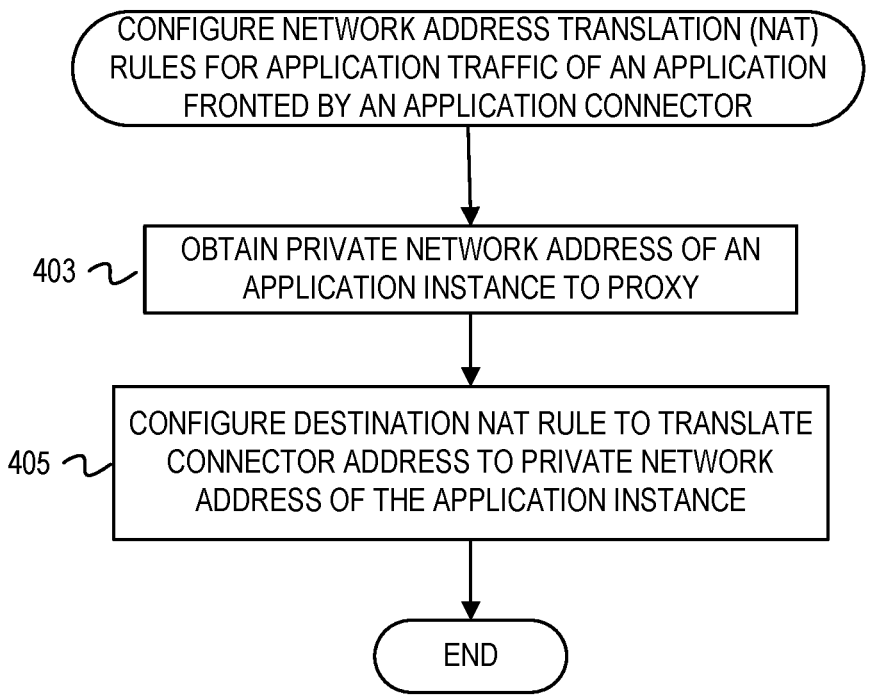
FIG. 4 is a flowchart of example operations to configure NAT rules for application traffic for an application fronted by a connector.

At block 317, the controller instructs the connector to configure a destination NAT rule for application traffic to flow to an instance of the application fronted by the connector. The connector communicates a message/command to configure the NAT rule to translate the connector-based local network address of the application instance to the private network address of the network instances. FIG. 4 expands upon the NAT rule configuration by the connector.

At block 319, the controller determines whether there is another application connector that will proxy for the application. If there is another application connector, then operational flow returns to block 311. Otherwise, operational flow proceeds to block 321. These example operations incorporate route creation (i.e., NAT rule configuration and DNS entry setting) into the application onboarding. These can be separated and run concurrently. For instance, application discovery can run separately while route creation is invoked as each application to be published is discovered.

At block 321, the controller publishes the application. For instance, the controller updates a setting or generates a notification that causes the name and global network address of the application to be available for queries.

At block 323, the controller determines whether there is another application to publish for the tenant. If not, then operational flow ends. If there is another application to publish, then operational flow returns to block 305.

As part of route creation, the connector communicates with the load balancer nodes to configure destination NAT rules to translate the global network address assigned to the application to the connector-based local network addresses assigned to the application instances. The controller can also set weights or biases for load balancing depending upon the load balancing algorithm being used. Connectors can be logically grouped based on tenant preference in control plane data. For instance, connectors can be grouped by application. Embodiments can logically group the connectors by both application and region. For example, logically grouping connectors by region and then sub-grouping by application.

FIG. 4 is a flowchart of example operations to configure NAT rules for application traffic for an application fronted by a connector. The description of the example operations refers to a connector as performing the operations.

At block 403, the connector obtains the private network address of an application instance that the connector is fronting. The private network address may be obtained by query of the local network. However, the connector can discover the private network address of an application instance using DNS or another application probe.

At block 405, the connector configures a destination NAT rule to translate the network address assigned to the application instance from the connectors network address aggregate external to the tenant network to the private network address of the application instance within the tenant network. The connector configures the destination NAT rule in response to a command or configuration message from a controller.

When traffic is flowing, a source NAT rule is configured to translate a source address of a traffic flow to the local network address assigned to the connector. The configuration of the source NAT rule is performed as an effect of the networking functionality of the connector and the destination NAT rule.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowcharts and/or block diagram block or blocks.

Figure 5:
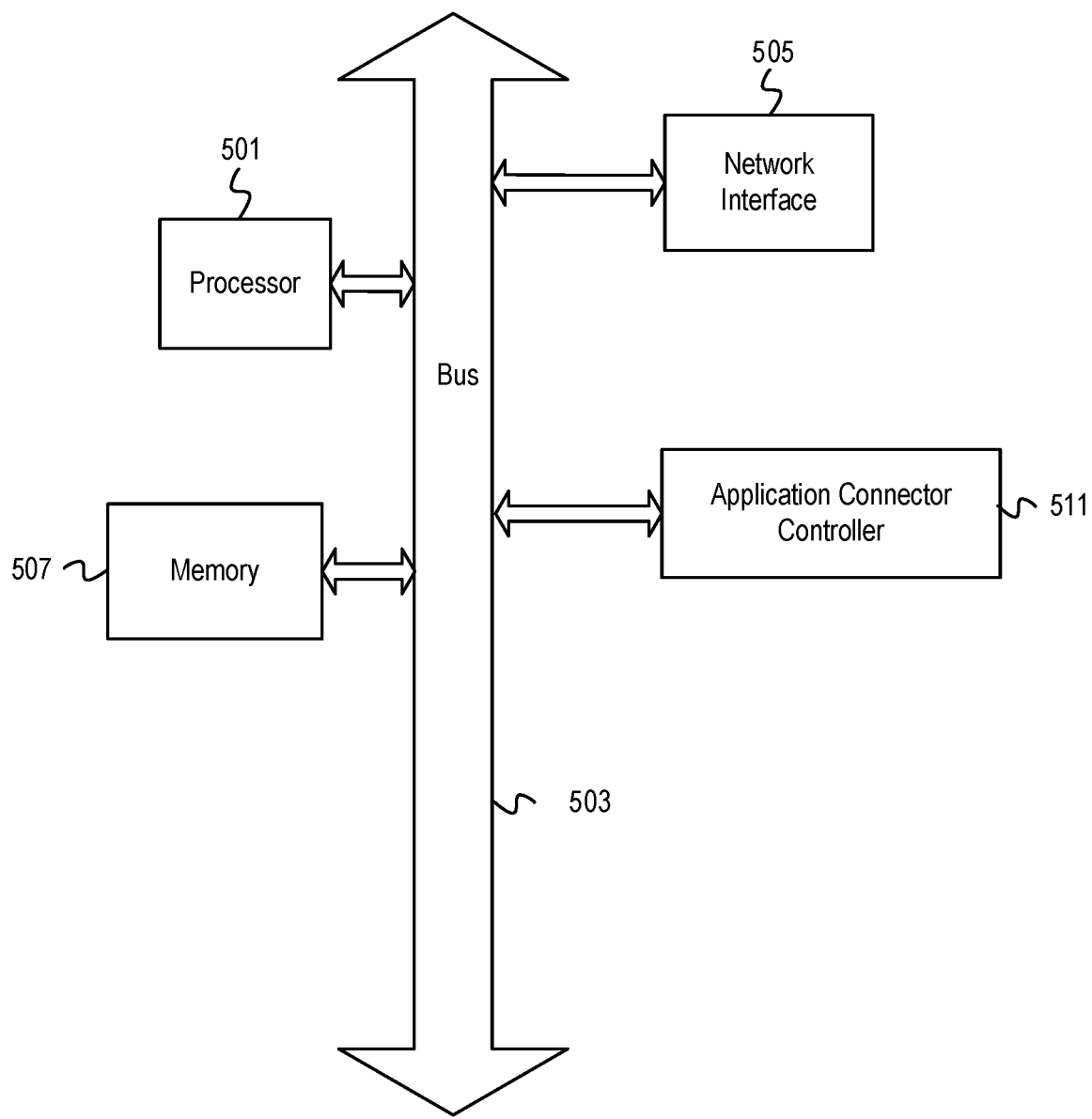
FIG. 5 depicts an example computer system with an application connector controller that facilitates secure publication of an application by logical network extension.

FIG. 5 depicts an example computer system with an application connector controller that facilitates secure publication of an application by logical network extension. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes an application connector controller 511. The application connector controller 511 orchestrates route creation through a network fabric to application connectors fronting application instances in other networks for secure exposure of the application. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor 501.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
setting, in a first domain name system (DNS) entry in a network fabric, a first name of a first application to resolve to a first network address from a first routable address space of the network fabric, wherein the first network address is assigned to the first application;
configuring, on a first network element of the network fabric, a first destination network address translation (NAT) rule to translate the first network address to a second network address, wherein the second network address is from a first network address aggregate assigned from the first routable address space to an application connector, wherein a first instance of the first application and the application connector are deployed in the first network;
configuring, on the application connector, a second destination NAT rule to translate the second network address to a private network address assigned to the first instance of the first application from a second routable address space corresponding to the first network; and
communicating traffic of the first application through the network fabric and to the first instance of the first application according to the first DNS entry and the first and second destination NAT rules.

2. The method of claim 1 further comprising establishing a tunnel between a third network element of the network fabric and the application connector and associating at least one of the first network address aggregate and the second network address with the tunnel.

3. The method of claim 1 further comprising assigning the first network address aggregate to the application connector based on deployment of the application connector in the first network.

4. The method of claim 1 further comprising:
logically defining a first group of application connectors;
assigning each member of the first group a network address aggregate from the first routable address space, wherein the first group of application connectors includes the application connector and the network address aggregates assigned to the first group include the first network address aggregate assigned to the application connector;
associating the first application with the first group of application connectors;
based on associating the first application with the first group of application connectors, assigning each instance of the first application a network address from the network address aggregate assigned to the corresponding one of the first group of application connectors, which includes assigning the second network address to the first instance of the first application; and
defining, in the network fabric, a load balancing rule to balance traffic destined for the first application across the first group of application connectors.

5. The method of claim 1 further comprising publishing availability of the first application after setting the first DNS entry and configuring the first and second destination NAT rules to securely expose the first application.

6. The method of claim 1, wherein the first routable address space is assigned to a first entity and the second routable address space is assigned to a second entity.

7. The method of claim 1, wherein the first network is one of a data center, private cloud, and virtual private cloud and the first name of the first application is a fully qualified domain name of the first application.

8. One or more non-transitory machine-readable medium having program code stored thereon, the program code comprising instructions to:
onboard an application of a tenant for presenting access to the application, wherein the instructions to onboard the application comprise instructions to,
determine a domain name for the application;
assign a first network address to the application from a first routable address space of a network fabric;
assign from the first routable address space a network address aggregate to each application connector deployed in each network for the application;
for each instance of the application, assign the application instance a network address from the network address aggregate of the corresponding application connector; and
create a route to each instance of the application through the network fabric without exposing private network addresses in each network, wherein the instructions to create the route comprise instructions to,
set, in a first domain name system (DNS) entry, the domain name of the application to resolve to the first network address;
for each application connector, configure a first destination network address translation (NAT) rule in the network fabric to translate the first network address to the network address assigned to the corresponding instance of the application; and
instruct each application connector to configure a second destination NAT rule on the application connector to translate the network address assigned to the application instance of the application connector to the private network address of the application instance.

9. The one or more non-transitory machine-readable medium of claim 8, wherein the program code further comprises instructions to discover a plurality of applications of the tenant including the application, wherein the instructions to onboard the application are executed based on selection of the application from the plurality of applications.

10. The one or more non-transitory machine-readable medium of claim 8, wherein the program code further comprises instructions to determine each region of each network and establish a tunnel from at least one per region network element of the network fabric to each application connector in the region.

11. The one or more non-transitory machine-readable medium of claim 8, wherein the program code further comprises instructions to:
  define a first logical group of the application connectors and associate the application with the first logical group; and
  configure in the network fabric a load balancing rule to balance traffic destined for the application across the first logical group.

12. The one or more non-transitory machine-readable medium of claim 8, wherein the instructions further comprise instructions to onboard the application connectors for the tenant, wherein the instructions to onboard the application connectors comprise instructions to assign the network address aggregates to the application connectors from the first routable address space.

13. The one or more non-transitory machine-readable medium of claim 8, wherein the program code further comprises instructions to publish indication of the application for access after creation of the route.

14. A system comprising:
  a plurality of application connectors deployed across a plurality of networks of a tenant, wherein the plurality of application connectors is assigned first network address aggregates from a first routable address space of a network fabric that is distinct from the plurality of networks; and
  a first controller programmed to communicate with network elements of the network fabric to create routes to instances of an application fronted by the plurality of deployed application connectors, wherein the first controller programmed to create the routes comprises,
    the first controller programmed to communicate with the plurality of deployed application connectors to establish tunnels with a first subset of the network fabric network elements;
    the first controller or a second controller programmed to,
      assign the application a first network address from the first routable address space;
      for each application instance fronted by a corresponding one of the plurality of deployed application connectors, assign a second network address to the application instance from the network address aggregate assigned to the corresponding one of the plurality of deployed application connectors;
      set a domain name system entry to resolve a domain name of the application to the first network address;
      for each of the plurality of networks hosting the application, configure in each of the plurality of application connectors deployed in the network for the application a first destination network address translation (NAT) rule to translate the second network address assigned to the application instance fronted by the application connector to a private network address assigned to the application instance hosted in the network; and
      configure in the network fabric, for each of the plurality of application connectors, a second destination NAT rule to translate the first network address to the second network address assigned to the application instance fronted by the deployed application connectors.

15. The system of claim 14, wherein the first or second controller is programmed to assign the first network address aggregates to the plurality of application connectors.

16. The system of claim 14, wherein the first or second controller is further programmed to determine each region in which the application connectors are deployed for the tenant and to identify the first subset of network elements based on each determined region.

17. The system of claim 14, wherein the plurality of application connectors deployed in the networks comprise firewalls, wherein each firewall is one of a hardware device and a software instantiated on a device.

18. The system of claim 14, wherein at least one of the first and the second controllers is external to the network fabric.

19. The system of claim 14, wherein the first controller or second controller is further programmed to determine the domain name of the application.

20. The system of claim 14, wherein the first controller or second controller is further programmed to publish indication of the application for access after creation of the routes.

* * * * *